US005757937A

United States Patent [19]

Itoh et al.

[11] Patent Number: 5,757,937

[45] Date of Patent: May 26, 1998

[54] ACOUSTIC NOISE SUPPRESSOR

[75] Inventors: Kenzo Itoh, Tokyo; Masahide Mizushima, Sayama, both of Japan

[73] Assignee: Nippon Telegraph and Telephone Corporation, Tokyo, Japan

[21] Appl. No.: 749,242

[22] Filed: Nov. 14, 1996

[30] Foreign Application Priority Data

Jan. 31, 1996 [JP] Japan .................................... 8-014874

[51] Int. Cl.[6] ...................................... H04B 15/00

[52] U.S. Cl. ............................ 381/94.3; 704/233

[58] Field of Search .................... 381/94, 94.3; 704/233

[56] References Cited

U.S. PATENT DOCUMENTS 5,377,277 12/1994 Bisping .................................... 381/94

5,479,517 12/1995 Linhard .................................... 381/97

5,550,924 8/1996 Helf et al. ................................ 381/94

*Primary Examiner*—Forester W. Isen

*Attorney, Agent, or Firm*—Pollock, Vande Sande & Priddy

[57] ABSTRACT

In an acoustic noise suppressor, a power spectrum component and a phase component are extracted from an input signal by a frequency analysis part, while at the same time a check is made in a speech/non-speech identification part to see if the input signal is a speech signal or noise. Only when the input signal is noise, its spectrum is stored in a storage part and is weighted by a psychoacoustic weighting function W(f), and the weighted spectrum is subtracted from the power spectrum of the input signal and is reconverted to a time-domain signal by making its inverse analysis.

11 Claims, 7 Drawing Sheets

ACOUSTIC NOISE SUPPRESSOR

BACKGROUND OF THE INVENTION

The present invention relates to an acoustic noise suppressor which suppresses signals (noise in this instance) other than speech signals or the like to be picked up in various acoustic noise environments, permitting efficient pickup of target or desired signals alone.

Usually, a primary object of ordinary acoustic equipment is to effectively pick up acoustic signals and to reproduce their original sounds through a sound system. The basic components of the acoustic equipment are (1) a microphone which picks up acoustic signals and converts them to electric signals, (2) an amplifying part which amplifies the electric signals, and (3) an acoustic transducer which reconverts the amplified electric signals into acoustic signals, such as a loudspeaker or receiver. The purpose of the component (1) for picking up acoustic signals falls into two categories: to pick up all acoustic signals as faithfully as possible, and to effectively pick up only a target or desired signal.

The present invention concerns "to effectively pick up only a desired signal." While the acoustic components of this category include a device for picking up a desired signal (which will hereinafter be referred to as a speech signal and other signals as noise for convenience of description) with higher efficiency through the use of a plurality of microphones or the like, the present invention is directed to a device for suppressing noise other than the speech signal in an input signal already picked up.

For a wide variety of purposes, speech in a noise environment is converted into an electric signal, which is subjected to acoustic processing according to a particular purpose to reproduce the speech (a hearing aid, a loudspeaker system for conference use, etc., for instance), or which electric signal is transmitted over a telephone circuit, for instance, or which electric signal is recorded (on a magnetic tape or disc) for reproducing therefrom the speech when necessary. When speech is converted into an electric signal for each particular purpose, background noise is also picked up by the microphone, and hence techniques for suppressing such noise are used to obtain the speech signal it is desired to convert. For example, in a multi-microphone system (J. L. Flanagan, D. A Berkley, G. W. Eliko, et at., "Autodirective Microphone Systems," Acoustica, Vol. 73, No. 2, pp. 58–71, 1991 and O. L. Frost, "An Algorithm for Linearly Constrained Adaptive Array Processing," Proc. IEEE. Vol. 60, No. 8, pp. 926–935, 1972, for instance), speech signals picked up by microphones placed at different positions are synthesized after being properly delayed so that their cross-correlation becomes maximum, by which the desired speech signals are added and the correlation of other sounds is made so small that they cancel each other. This method operates effectively for speech at specific positions but has a shortcoming that its effect sharply diminishes when the target speech source moves.

Another conventional method is one that pays attention to the fact that the actual background noise is mostly stationary noise such as noise generated by air conditioners, refrigerators and car engine noise. According to this method, only the noise power spectrum is subtracted from an input signal with background noise superimposed thereon and the difference power spectrum is returned by an inverse FFT scheme to a time-domain signal to obtain a speech signal with the stationary noise suppressed (S. Boll, "Suppression of Acoustic Noise in Speech Using Spectral Subtraction," IEEE Trans., ASSP, Vol. 27, No. 2, pp. 113–120, 1979). A description will be given below of this method, since the present invention is also based on it.

FIG. 1 illustrates in block form the basic configuration of the prior art acoustic noise suppressor according to the above-mentioned literature. Reference numeral 11 denotes an input terminal, 12 is a signal discriminating part for determining if the input signal is a speech signal or noise, 13 is a frequency analysis or FFT (Fast Fourier Transform) part for obtaining the power spectrum and phase information of the input signal, and 14 is a storage part. Reference numeral 15 denotes a switch which is controlled by the output from the frequency analysis part 12 to make only when the input signal is noise so that the output from the frequency analysis part 13 is stored in the storage part 14. Reference numeral 16 denotes a subtraction part, 17 is an inverse frequency analysis or inverse FFT part, and 18 is an output terminal.

An input signal fed to the input terminal 11 is applied to the signal discriminating part 12 and the frequency analysis part 13. The signal discriminating part 12 discriminates between speech and noise through utilization of the frequency distribution characteristic of the signal level (R. J. McAulay and M. L. Malpass, "Speech Enhancement Using a Soft-Decision Noise Suppression Filter," IEEE Trans., ASSP, Vol. 28, No. 2, pp. 137–145, 1980). The frequency analysis part 13 makes a frequency analysis of the input signal for each analysis period (an analysis window) to obtain the power spectrum S(f) and phase information P(f) of the input signal. The frequency analysis mentioned herein means a discrete digital Fourier transform and is usually made by FFT processing only when the input signal discriminated by the signal discriminating part 12 is noise, the switch 15 is connected to an N-side, through which the power spectrum characteristic $S_n(f)$ of the noise of the analysis period obtained by the frequency analysis part 13 is stored in the storage part 14. When the input signal discriminated by the signal discriminating part 12 is "speech," the switch 15 is connected to an S-side, inhibiting the supply of the input signal power spectrum S(f) to the storage part 14. The input signal power spectrum S(f) is compared in level by subtracting part 16 with the noise power spectrum $S_n(f)$ stored in the storage part 14 for each corresponding frequency f. If the level of the input signal power spectrum S(f) is higher than the level of the noise power spectrum $S_n(f)$, a noise spectrum multiplied by constant α is subtracted from the input signal power spectrum S(f) as indicated by the following equation (1); if not, S'(f) is replaced with zero or the level n(f) of a corresponding frequency component of a predetermined low-level noise spectrum:

$$S'(f) = S(f) - \alpha S_n(f) \quad \text{if } S(f) > S_n(f) \qquad (1)$$
$$= 0 \text{ or } n(f) \quad \text{else}$$

where α is a subtraction coefficient and n(f) is low-level noise that is usually added to prevent the spectrum after subtraction from going negative. This processing provides the spectrum S'(f) with the noise component suppressed. The spectrum characteristic S'(f) is reconverted to a time-domain signal by inverse Fourier transform (inverse FFT, for instance) processing in the inverse frequency analysis part 17 through utilization of the phase information P(f) obtained by fast Fourier transform processing in the frequency analysis part 13, the time-domain signal thus obtained being provided to the output terminal 18. As the signal phase information P(f), the analysis result is usually employed intact.

With the above processing, a signal from which the frequency spectral component of the noise component has been removed is provided at the output terminal 18. The above noise suppression method ideally suppresses noise when the noise power spectral characteristic is virtually stationary. Usually, noise characteristics in the natural world vary every moment though they are "virtually stationary." Hence, such a conventional noise suppressor as described above suppresses noise to make it almost imperceptible but some noise left unsuppressed is newly heard, as a harsh grating sound (hereinafter referred to as residual noise)—this has been a serious obstacle to the realization of an efficient noise suppressor.

SUMMARY OF THE INVENTION

It is therefore an object of the present invention to provide a noise suppressor which permits efficient picking up of target or desired signals alone.

The acoustic noise suppressor according to the present invention comprises:

- frequency analysis means for making a frequency analysis of an input signal for each fixed period to extract its power spectral component and phase component;
- analysis/discrimination means for analyzing the input signal for the above-said each period to see if it is a target signal or noise and for outputting the analysis result;
- noise spectrum update/storage means for calculating an average noise power spectrum from the power spectrum of the input signal of the period during which the determination result is indicative of noise and storing the average noise power spectrum;
- psychoacoustically weighted subtraction means for weighting the average noise power spectrum by a psychoacoustic weighting function and for subtracting the weighted mean noise power spectrum from the input signal power spectrum to obtain the difference power spectrum; and
- inverse frequency analysis means for converting the difference power spectrum into a time-domain signal.

The acoustic noise suppressor of the present invention is characterized in that the average power spectral characteristic of noise, which is subtracted from the input signal power spectral characteristic, is assigned a psychoacoustic weight so as to minimize the magnitude of the residual noise that has been the most serious problem in the noise suppressor implemented by the aforementioned prior art method. To this end, the present invention newly uses a psychoacoustic weighting coefficient W(f) in place of the subtraction coefficient a in Eq. (1). The introduction of such a weighting coefficient permits significant reduction of the residual noise which is psychoacoustically displeasing.

In other words, the subtraction coefficient $\alpha$ in Eq. (1) is conventionally set at a value equal to or greater than 1.0 with a view to suppressing noise as much as possible. With a large value of this coefficient, noise can be drastically suppressed on the one hand, but on the other hand, the target signal component is also suppressed in many cases and there is a fear of "excessive suppression." The present invention uses the weighting coefficient W(f) which does not significantly distort and increases the amount of noise to be suppressed, and hence it minimizes degradation of processed speech quality.

Furthermore, residual noise can be minimized by the above-described method, but according to the kind and magnitude (signal-to-noise ratio) of noise, the situation occasionally arises where the residual noise cannot completely be suppressed, and in many cases this residual noise becomes a harsh grating in periods during which no speech signals are present. As an approach to this problem, the noise suppressor of the present invention adopts loss control of the residual noise to suppress it during signal periods with substantially no speech signals.

The present invention discriminates between speech and noise, multiplies the noise by a psychoacoustic weighting coefficient to obtain the noise spectral characteristic and subtracts it from the input signal power spectrum, and hence the invention minimizes degradation of speech quality and drastically reduces the psychoacoustically displeasing residual noise.

Besides, loss control of the residual noise eliminates it almost completely.

DESCRIPTION OF THE PREFERRED EMBODIMENT

Figure 2:
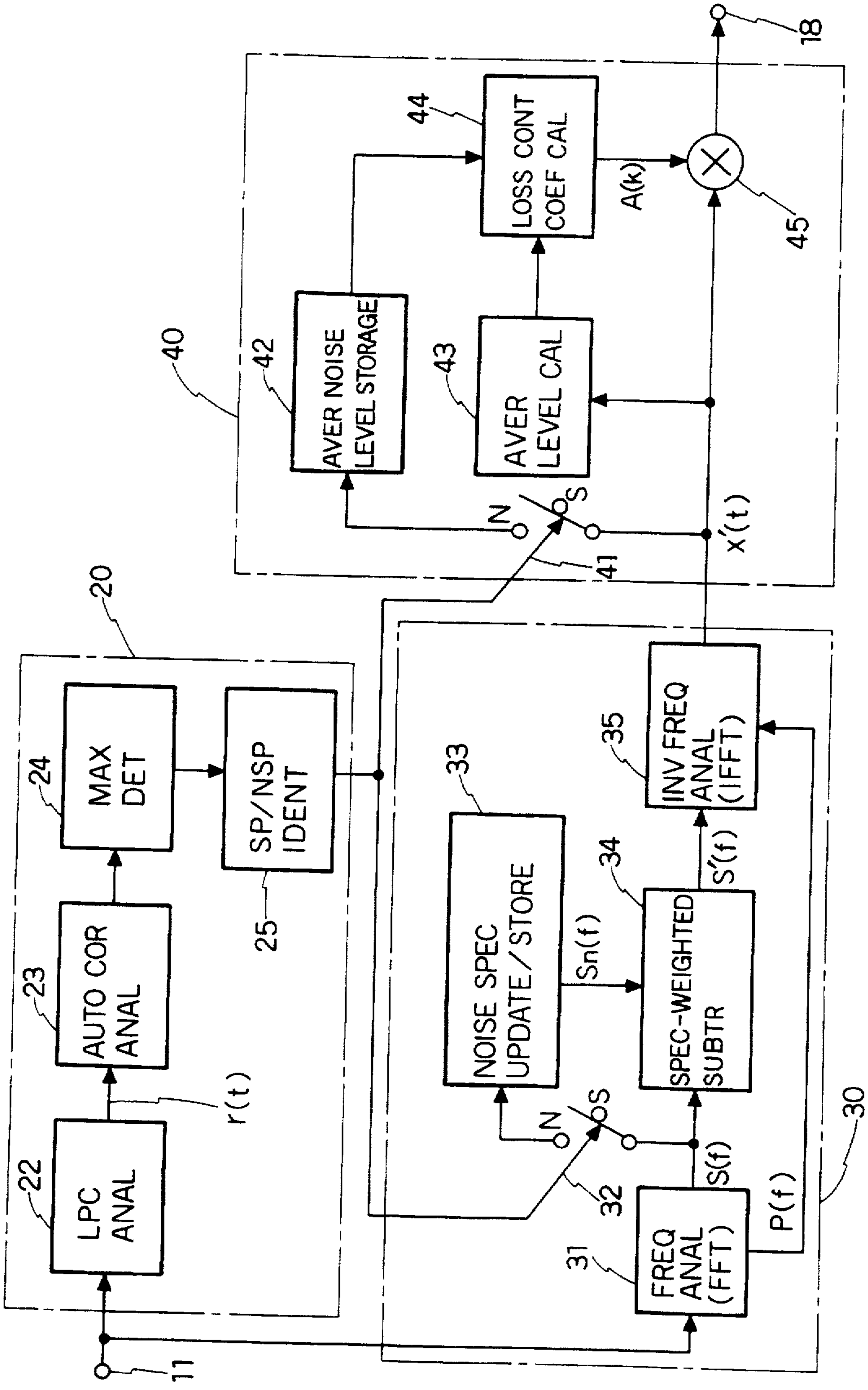
FIG. 2 is a block diagram illustrating an embodiment of the noise suppressor according to the present invention.

FIG. 2 illustrates in block form an embodiment of the noise suppressor according to the present invention. Reference numeral 20 denotes an analysis/discrimination part, 30 is a weighted noise suppressing part, is a loss control part. The analysis/discrimination part 20 comprises an LPC (Linear Predictive Coding) analysis part 22, an autocorrelation analysis part 23, a maximum value detecting part 24, and a speech/non-speech identification part 25. For each analysis period the analysis/discrimination part 20 outputs the result of a decision as to whether the input signal is a speech signal or noise, and effects ON/OFF control of switches 32 and 41 described later on.

The weighted noise suppression part 30 comprises a frequency analysis part (FFT) 31, a noise spectrum update/storage part 33, a psychoacoustically weighted subtraction part 34, and an inverse frequency analysis part 35. Each time it is supplied with the spectrum (noise spectrum) $Sn_k(f)$ of a new period k from the frequency analysis part 31 via a switch 32, the noise spectrum update/storage part 33 performs a weighted addition of the newly supplied noise spectrum $Sn_k(f)$ and a previous updated noise spectrum $Sn_{old}(f)$ to obtain an averaged updated noise spectrum $Sn_{new}(f)$ and holds it until the next updating and, at the same time, provides it as the noise spectrum Sn(f) for suppression use to the psychoacoustically weighted subtraction part 34. The psychoacoustically weighted subtraction part 34 multiplies the updated noise spectrum Sn(f) by the psychoacoustic weighting coefficient W(f) and subtracts the psychoacoustically weighted noise spectrum from the spectrum S(f) provided from the frequency analysis part 31, thereby suppressing noise. The thus noise-suppressed spectrum is converted by the inverse frequency analysis part 35 into a time-domain signal.

The loss control part 40 comprises a switch 41, an averaged noise level storage part 42, an output signal calculation part 43, a loss control coefficient calculation part 44 and a convolution part 45. The loss control part 40 further reduces the residual noise suppressed by the psychoacoustically weighted noise suppression part 30.

Figure 1:
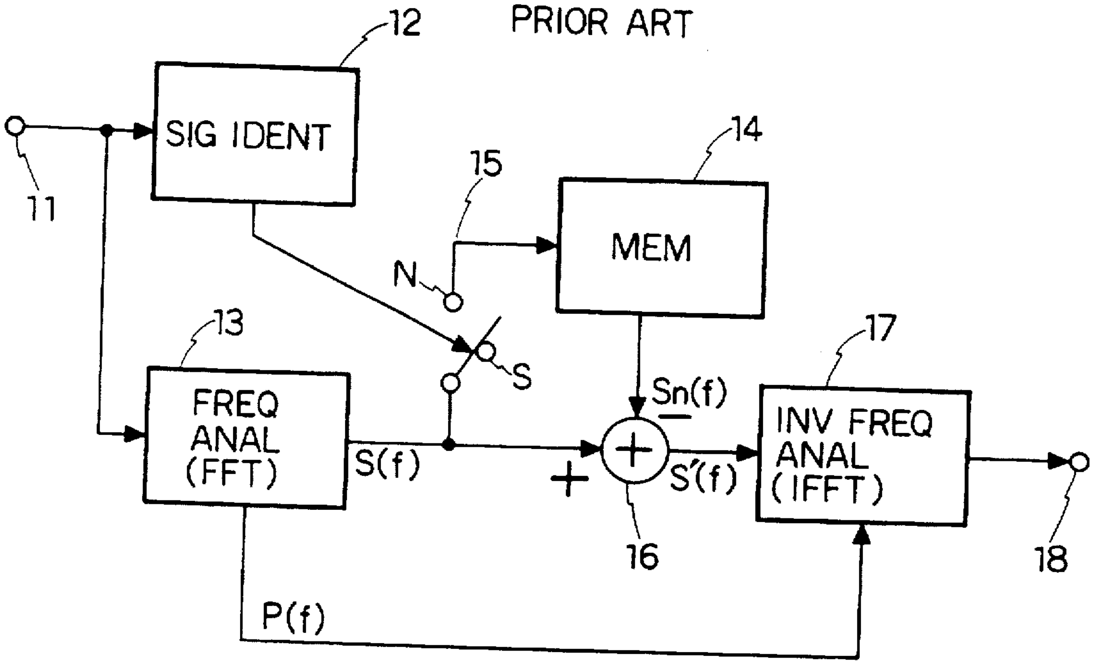
FIG. 1 is a block diagram illustrating an example of a conventional noise suppressor.

Next, the operation of the FIG. 2 embodiment of the present invention will be described in detail with reference to FIG. 3 which shows waveforms occurring at respective parts of the FIG. 2 embodiment. Also in this embodiment, as is the case with the FIG. 1 prior art example, a check is made in the analysis/discrimination part 20 to see if the input signal is speech or noise for each fixed analysis period (analysis window range), then the power spectrum of the noise period is subtracted in the weighted noise suppression part 30 from the power spectrum of each signal period, and the difference power spectrum is converted into a time-domain signal through inverse Fourier transform processing, thereby obtaining a speech signal with stationary noise suppressed.

For example, an input signal x(t) (assumed to be a waveform sampled at discrete time t) from a microphone (not shown) is applied to the input terminal 11, and as in the prior art, its waveform for an 80-msec analysis period is Fourier-transformed (FFT, for instance) in the frequency analysis part 31 at time intervals of, for example, 40 msec to thereby obtain the power spectrum S(f) and phase information P(f) of the input signal. At the same time, the input signal x(t) is applied to the LPC analysis part 22, wherein its waveform for the 80-msec analysis period is LPC-analyzed every 40 msec to extract an LPC residual signal r(t) (hereinafter referred to simply as a residual signal in some cases). The human voice is produced by the resonance of the vibration of the vocal cords in the vocal tract, and hence it contains a pitch period component; its LPC residual signal r(t) contains pulse trains of the pitch period as shown on Row B in FIG. 3 and its frequency falls within the range of between 50 and 300 Hz, though different with a male, a female, a child and an adult.

Figure 3:
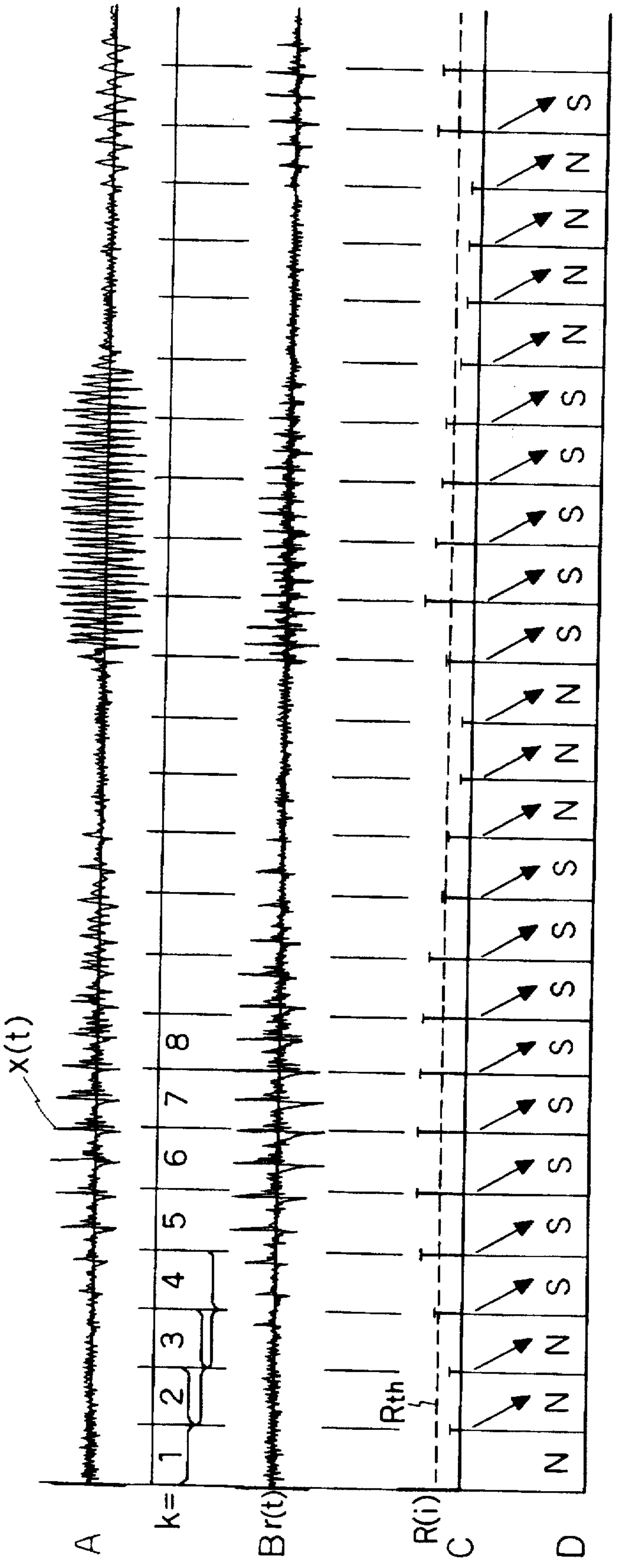
FIG. 3 is a waveform diagram for explaining the operation in the FIG. 2 embodiment.

The residual signal r(t) is fed to the autocorrelation analysis part 23, wherein its autocorrelation function R(i) is obtained (FIG. 3C). The autocorrelation function R(i) represents the degree of the periodicity of the residual signal. In the maximum value detection part 24 the peak value (which is the maximum value and will hereinafter be identified by Rmax) of the autocorrelation function R(i) is calculated, and the peak value Rmax is used to identify the input signal in the speech/non-speech identification part 25. That is, the signal of each analysis period is decided to be a speech signal or noise, depending upon whether the peak value Rmax is larger or smaller than a predetermined threshold value Rmth. On Row D in FIG. 3 there are shown the results of signal discriminations made 40 msec behind the input signal waveform at time intervals of 40 msec, the speech signal being indicated by S and noise by N.

The maximum autocorrelation value Rmax is often used as a feature that well represents the degree of the periodicity of the signal waveform. That is, many of noise signals have a random characteristic in the time or frequency domain, whereas speech signals are mostly voiced sounds and these signals have periodicity based on the pitch period component. Accordingly, it is effective to distinguish the period of the signal with no periodicity from noise. Of course, the speech signal includes unvoiced consonants; hence, no accurate speech/non-speech identification can be achieved only with the feature of periodicity. It is extremely difficult, however, to accurately detect unvoiced consonants of very low signal levels (p, t, k, s, h and f, for instance) from various kinds of environmental noise. To subtract the noise spectrum from the input signal spectrum, the noise suppressor of the present invention makes the speech/non-speech identification on the basis of an idea that identifies the signal period which is surely considered not to be a speech signal period, that is, the noise period, and calculates its long-time mean spectral feature.

Figure 4:
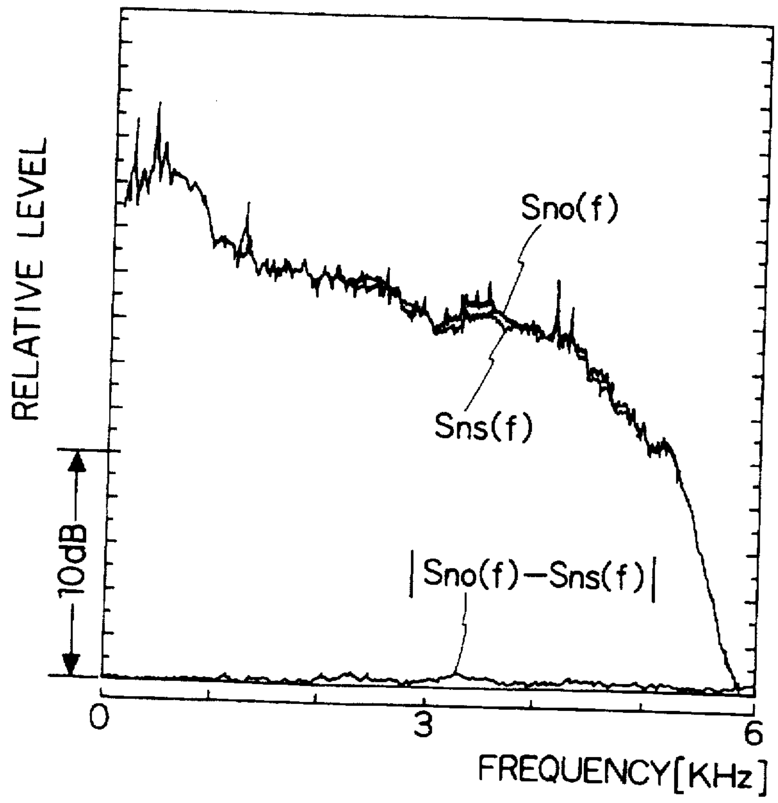
FIG. 4 is a graph showing an example of an average spectral characteristic of noise discriminated using a maximum autocorrelation coefficient Rmax.

In other words, it is sufficient only to calculate the average spectral feature of the signal surely considered to be a noise signal, and a typical noise spectral characteristic can be obtained by setting the aforementioned peak value Rmax at a small value. For example, FIG. 4 shows an example of the average spectral feature Sns(f) of the signal period identified, using the peak value Rmax, as a noise period from noise signals picked up in a cafeteria. In FIG. 4 there are also shown the average spectral characteristic Sno(f) obtained by extracting noise periods discriminated through visual inspection from the input signal waveform and frequency-analyzing them, and their difference characteristic |Sno(f)−Sns(f)|. The threshold value Rmth of the peak value Rmax was 0.14, the measurement time was 12 sec and the noise identification rate at this time was 77.8%. As will be seen from FIG. 4, the difference between the average spectral characteristics Sno(f) and Sns(f) is very small and, according to the peak value Rmax, the average noise spectral characteristic can be obtained with a considerably high degree of accuracy even from environmental sounds mixed with various kinds of noise as in a cafeteria.

Figure 5:
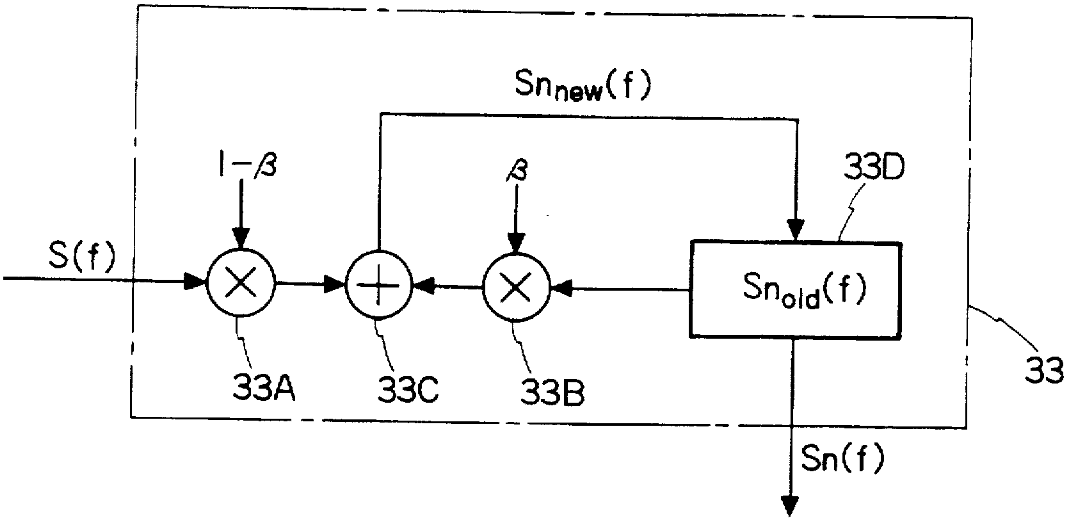
FIG. 5 is a block diagram showing an example of the functional configuration of a noise spectrum update/storage part 33 in the FIG. 2 embodiment.

Turning back to FIG. 2, the frequency analysis part 31 calculates the power spectrum S(f) of the input signal x(t) while shifting the 80-msec analysis window at the rate of 40 msec. Only when the input signal period is identified as a noise period by the speech/non-speech identification part 25, the switch 32 is closed, through which the spectrum S(f) at that time is stored as the noise spectrum $S_n(f)$ in the noise spectrum update/storage part 33. As depicted in FIG. 5, the noise spectrum update/storage part 33 is made up of multipliers 33A and 33B, an adder 33C and a register 33D. The noise spectrum update/storage part 33 updates, by the following equation, the noise spectrum when the input signal of the analysis period k is decided to be noise N:

$$Sn_{new}(f)=\beta Sn_{old}(f)+(1-\beta)S_k(f) \quad (2)$$

where $Sn_{new}$ is the newly updated noise spectrum, is $Sn_{old}$ the previously updated noise spectrum, $S_k(f)$ is the input signal spectrum when the input signal of the analysis period k is identified as noise, and β is a weighting function. That is, when the input signal period is decided to be a noise period, the spectrum $S_k(f)$ provided via the switch 32 from the frequency analysis part 31 to the multiplier 33A is multiplied by the weight (1−β), while at the same time the previous updated noise spectrum $Sn_{old}$ read out of the register 33D is fed to the multiplier 33B, whereby it is multiplied by β. These multiplication results are added together by the adder 33C to obtain the newly updated noise spectrum $Sn_{new}(f)$. The updated noise spectrum $Sn_{new}(f)$ thus obtained is used to update the contents of the register 33D.

The value of the weighting function β is suitably chosen in the range of 0<β<1. With β=0, the frequency analysis result Sk(f) of the noise period is used intact as a noise spectrum for cancellation use, in which case when the noise spectrum undergoes a sharp change, it directly affects the cancellation result, producing an effect of making speech hard to hear. Hence, it is undesirable for the value of the weighting function β to be zero. With the weighting function β set in the range of 0<β<1, a weighted mean of the previously updated noise spectrum $Sn_{old}(f)$ and the newly updated spectrum $S_k(f)$ is obtained, making it possible to provide a less sharp spectral change. The larger the value of the weighting function β, the stronger the influence of the updated spectra in the past on the previously updated spectrum $Sn_{old}(f)$; therefore, the weighted mean in this instance has the same effect as that of all noise spectra from the past to the present (the further back in time, the less the average is weighted). Accordingly, the updated noise spectrum $Sn_{new}(f)$ will hereinafter be referred to also as an averaged noise spectrum. In the updating by Eq. (2), the only updated averaged noise spectrum $Sn_{new}(f)$ needs to be stored; namely, there is no need of storing a plurality of previous noise spectra.

Figure 6:
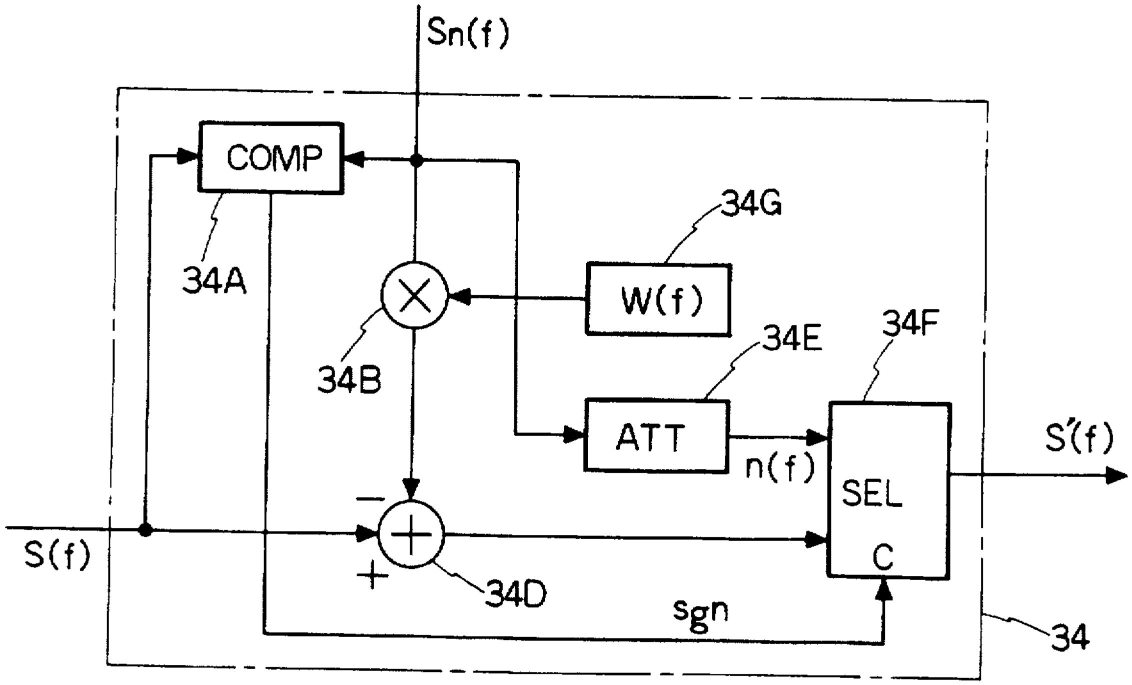
FIG. 6 is a block diagram showing an example of the functional configuration of a psychoacoustically weighted subtraction part 34 in the FIG. 2 embodiment.

The updated averaged noise spectrum $Sn_{new}(f)$ from the noise spectrum update/storage part 33 will hereinafter be represented by $S_n(f)$. The averaged noise spectrum $S_n(f)$ is provided to the psychoacoustically weighted subtraction part 34. As shown in FIG. 6, the psychoacoustically weighted subtraction part 34 is made up of a comparison part 34A, a weight multiplication part 34B, a psychoacoustic weighting function storage part 34G, a subtractor 34D, an attenuator 34E and a selector 34F. In the weight multiplication part 34B the averaged noise spectrum $S_n(f)$ is multiplied by a psychoacoustic weighting function W(f) from the psychoacoustic weighting function storage part 34G to obtain a psychoacoustically weighted noise spectrum W(f) $S_n(f)$. The psychoacoustically weighted noise spectrum W(f) $S_n(f)$ is provided to the subtractor 34D, wherein it is subtracted from the spectrum S(f) from the frequency analysis part 31 for each frequency. The subtraction result is provided to one input of the selector 34F, to the other input of which 0 or the averaged noise spectrum $S_n(f)$ is provided as low-level noise n(f) after being attenuated by the attenuator 34E. The FIG. 6 embodiment shows the case where the low-level noise n(f) is fed to the other input of the selector 34F. The comparison part 34A compares, for each frequency, the level of the power spectrum s(f) from the frequency analysis part 31 and the level of the averaged noise spectrum $S_n(f)$ from the noise spectrum update/storage part 33; the comparator 34A applies, for example, a control signal sgn=1 or sgn=0 to a control terminal of the selector 34F for each frequency, depending upon whether the level of the power spectrum s(f) is higher or lower than the level of the averaged noise spectrum $S_n(f)$. When supplied with the control signal sgn=1 at its control terminal for each frequency, the selector 34F selects the outputs from the subtractor 34D and outputs it as a noise suppressing spectrum S'(f), and when supplied with the control signal sgn=0, it selects the output n(f) from the attenuator 34E and outputs it as the noise suppressing spectrum S'(f).

The above-described processing by the psychoacoustically weighted subtraction part 34 is expressed by the following equation:

$$\begin{aligned} S'(f) &= S(f) - W(f)S_n(f) \quad \text{if } S(f) > S_n(f) \\ &= 0 \text{ or } n(f) \quad \text{else} \end{aligned} \tag{3}$$

That is, when the level of the power spectrum S(f) from the frequency analysis part 31 at the frequency f is higher than the averaged noise power spectrum $S_n(f)$ (for example, a speech spectrum contains a frequency component which satisfies this condition), the noise suppression is carried out by subtracting the level of the psychoacoustically weighted noise spectrum $W(f)S_n(f)$ at the corresponding frequency f, and when the power spectrum S(f) is lower than that $S_n(f)$, the noise suppression is performed by forcefully making the noise suppressing spectrum S'(f) zero, for instance.

Incidentally, even if the input signal is a speech signal, there is a possibility that the level of its power spectrum S(f) becomes lower than the level of the noise spectrum. Conversely, when the input signal period is a non-speech period and noise is stationary, the condition $S(f)<S_n(f)$ is almost satisfied and the spectrum S'(f) is made, for example, zero over the entire frequency band. Accordingly, if the speech period and the noise period are frequently repeated, a completely silent period and the speech period are repeated, speech may sometimes become hard to hear. To avoid this, when $S(f)<S_n(f)$, the noise suppressing spectrum S'(f) is not made zero but instead, for example, white noise n(f) or the averaged noise spectrum Sn(f), obtained in the noise spectrum update/storage part 33 as described above with reference to FIG. 6, may be fed as a background noise spectrum S'(f)/A=n(f) to the inverse frequency analysis part 35 after being attenuated down to such a low level that noise is not grating. In the above, A indicates the amount of attenuation.

Figure 7:
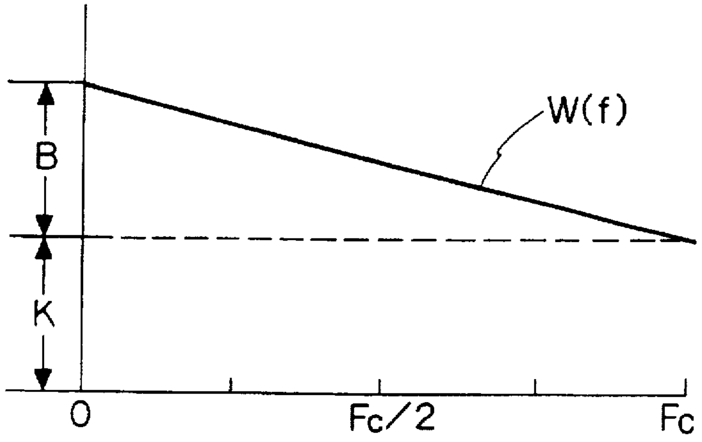
FIG. 7 is a graph showing an example of a psychoacoustic weighting coefficient W(f)

While the above-described processing by Eq. (3) is similar to the conventional processing by Eq. (1), the present invention entirely differs from the prior art in that the constant a in Eq. (1) is replaced by with the psychoacoustic weighting function W(f) having a frequency characteristic. The psychoacoustic weighting function W(f) produces an effect of significantly suppressing the residual noise in the noise-suppressed signal as compared with that in the past, and this effect can be further enhanced by a scheme using the following equation (4). Replacing f in W(f) with i as each discrete frequency point, it is given by $$W(i)=\{B-(B/f_c)i\}+K,\ i=0, \ldots, f_c \tag{4}$$

where $f_c$ is a value corresponding to the frequency band of the input signal and B and K are predetermined values. The larger the values B and K, the more noise is suppressed. The psychoacoustic weighting function expressed by Eq. (4) is a straight line along which the weighting coefficient W(i) becomes smaller with an increase in frequency i as shown in FIG. 7, for instance. This psychoacoustic weighting function naturally produces the same effect when simulating not only such a characteristic indicated by Eq. (4) but also an average characteristic of noise. In the case of splitting the weighting function characteristic W(f) into two frequency regions at a frequency $f_m=f_c/2$, similar results can be obtained even if a desired distribution of weighting function is chosen so that the average value of the weighting function in the lower frequency region is larger than in the higher frequency region as expressed by the following equation:

$$(1/f_m)\sum_{i=1}^{f_m} W(i) > \{1/(f_c-f_m)\}\sum_{i=f_m+1}^{f_c} W(i) \quad (5)$$

Further, the predetermined values B and K may be fixed at certain values unique to each acoustic noise suppressor, but by adaptively changing the according to the kind and magnitude of noise, the noise suppression efficiency can be further increased.

As the result of the processing described above, the psychoacoustically weighted subtraction part 34 outputs the spectrum S'(f) to which the average spectrum of noise superimposed on the input signal has been suppressed. The spectrum S'(f) thus obtained is subjected to inverse FFT processing in the inverse frequency analysis part 35 through utilization of the phase information P(f) obtained by FFT processing in the frequency analysis part 31 for the same analysis period, whereby the frequency-domain signal S'(f) is reconverted to the time-domain signal x'(t). By this inverse FFT processing, a waveform 80 msec long is obtained every 40 msec in this example. The inverse frequency analysis part 35 further multiplies each of these 80-msec time-domain waveforms by, for example, a cosine window function and overlaps the waveforms while shifting them by one-half (40 msec) of the analysis window length 80 msec to generate a composite waveform, which is output as the time-domain signal x'(t).

This signal x'(t) is a speech signal with the noise component suppressed, but in practice, the spectral characteristics of various kinds of ever-changing environmental noise differs somewhat from the average spectral characteristic. Hence, even if noise could be reduced sharply, the residual noise component still remains unremoved, and depending on the kind and magnitude of the residual noise, it might be necessary to further suppress the noise level. As a solution to this problem, the FIG. 2 embodiment performs the following processing in the loss control part 40.

That is, the average level $L_n(k_n)$ of the residual noise for that period from the inverse frequency analysis part 35 which corresponds to the period $k_n$ in which the input signal was identified as noise is stored in the average noise level storage part 42, kn being the number of the noise period. This mean noise level $L_n(k_n)$ is updated only when the input signal is identified as noise, as is the case with the aforementioned mean spectral characteristic. For example, the average noise level $L_{new}$ updated every noise period $k_n$ is given by the following equation:

$$L_{new}=\gamma L_{old}+(1-\gamma)L_n(k) \quad (6)$$

where $L_{old}$ is the average noise level before being updated and $L_n(k_n)$ represents the residual noise level in the analysis period $k_n$. γ is a weighting coefficient for averaging as is the case with β in Eq. (2) and it is set in the range $0<\gamma<0$. A loss control coefficient A(k) for the period k is calculated by the following equation in the loss control coefficient calculation part 44:

$$A(k)=L_s(k)/\mu L_{new} \quad (7)$$

The average signal level $L_s(k)$ is calculated in the output signal calculation part 43 for the corresponding period k of the output signal x'(t) provided from the inverse frequency analysis part 35. In the above, μ is a desired loss, which is usually set to produce a loss of 6 to 10 dB or so. In this instance, however, the loss control coefficient A(k) is set in the range of $0<A(k)\leqq 1.0$. The output signal that is ultimately obtained from this device is produced by multiplying the output signal waveform x'(t) from the inverse frequency analysis part 35 by the loss control coefficient A(k) in the multiplication part 45; a noise-suppressed signal is provided at the output terminal 18.

Figure 8:
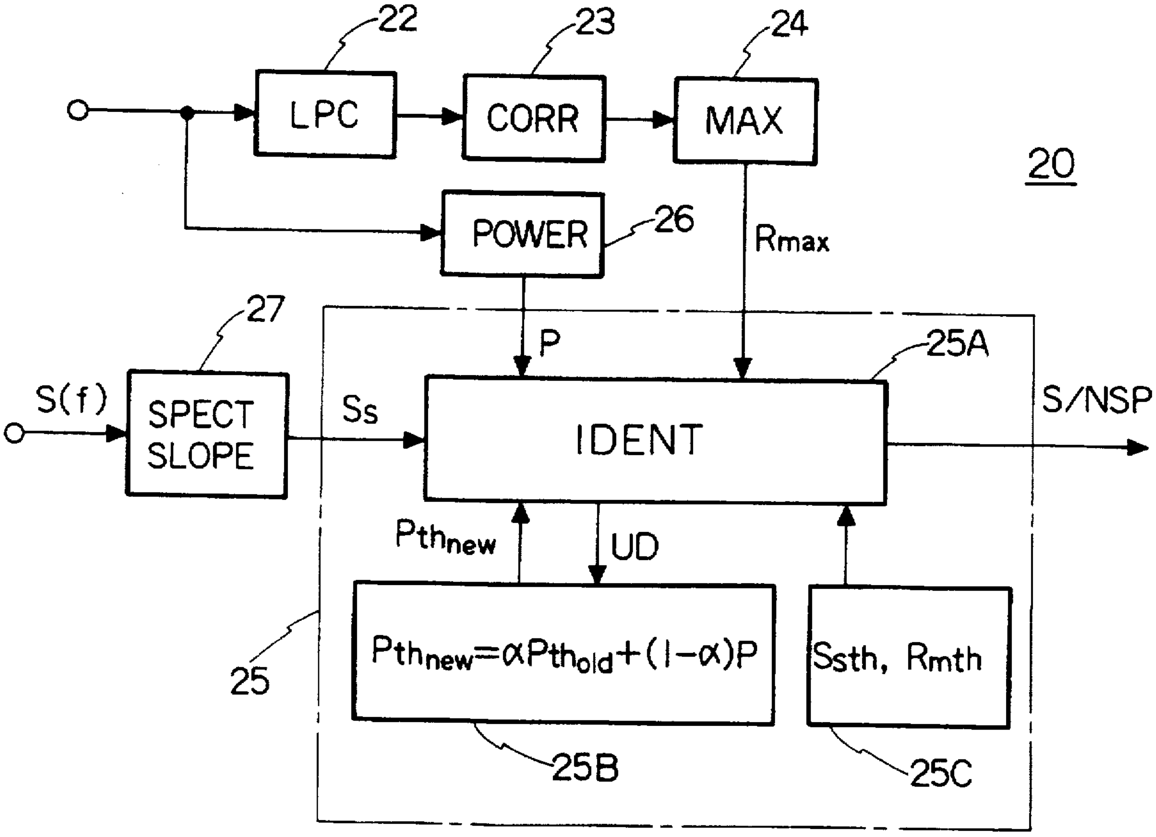
FIG. 8 is a block diagram illustrating another example of the configuration of an analysis/discrimination part 20.

In the FIG. 2 embodiment, the input signal is identified as speech or non-speech, depending only on whether the maximum autocorrelation coefficient Rmax of the LPC residual is larger than the predetermined threshold value Rmth. Another speech/non-speech identification scheme will be described with reference to FIG. 8. FIG. 8 shows another embodiment of the invention which corresponds to the analysis/discriminating part 20 in FIG. 2. This example differs from the analysis/discriminating part 20 in FIG. 1 in that a power detecting part 26 and a spectrum slope detecting part 27 are added and that the speech/non-speech identification part 25 is made up of an identification part 25A, a power threshold value updating part 25B and a parameter storage part 25C. That is, when noise of large power and containing a pitch period component is input thereinto, the analysis/discriminating part 20 in FIG. 2 is likely to decide that period as a speech period. To avoid this, the FIG. 8 embodiment discriminates between noise and speech through utilization of the feature of the human speech power spectral distribution that the average level is high in the low-frequency region but low in the high-frequency region—this ensures discrimination between the speech period and the non-speech period.

As in the case of FIG. 2, the input signal is processed for each analysis period by the LPC analysis part 22, the autocorrelation analysis part 23 and the maximum value detecting part 24, in consequence of which the maximum value Rmax of the autocorrelation function is detected. At the same time, the average power (rms) P of each analysis period is calculated by the power detecting part 26. On the other hand, the spectrum S(f) obtained in the frequency analysis part 31 in FIG. 2 is provided to the spectral slope detecting part 27, wherein the slope $S_s$ of the power spectral distribution is detected. These detected values Rmax, P and Ss are provided to the speech/non-speech identification part 25. In the parameter storage part 25C of the speech/non-speech identification part 25 there are stored the predetermined threshold value Rmth for the maximum autocorrelation coefficient and a predetermined mean slope threshold value $S_s$th, which are read out of the storage part 25C and into the identification part 25A as required. The identification part 25 determines if the input signal period is a speech, stationary noise or nonstationary noise period, following the identification algorithm which will be described later on with reference to FIG. 9. When it is determined in the identification part 25A that the maximum autocorrelation coefficient Rmax is smaller than the threshold value Rmth and that the input signal does not contain the pitch period component (that is, the input signal is not at least speech), the power threshold value updating part 25B updates by the following equation, for each speech period, the power threshold value Pth which is a criterion for determining whether the signal of the corresponding signal period is stationary or nonstationary noise on the basis of the average signal power P of that signal period detected by the power detecting part 26:

$$Pth_{new}=\alpha Pth_{old}+(1-\alpha)P \quad (8)$$

Figure 9:
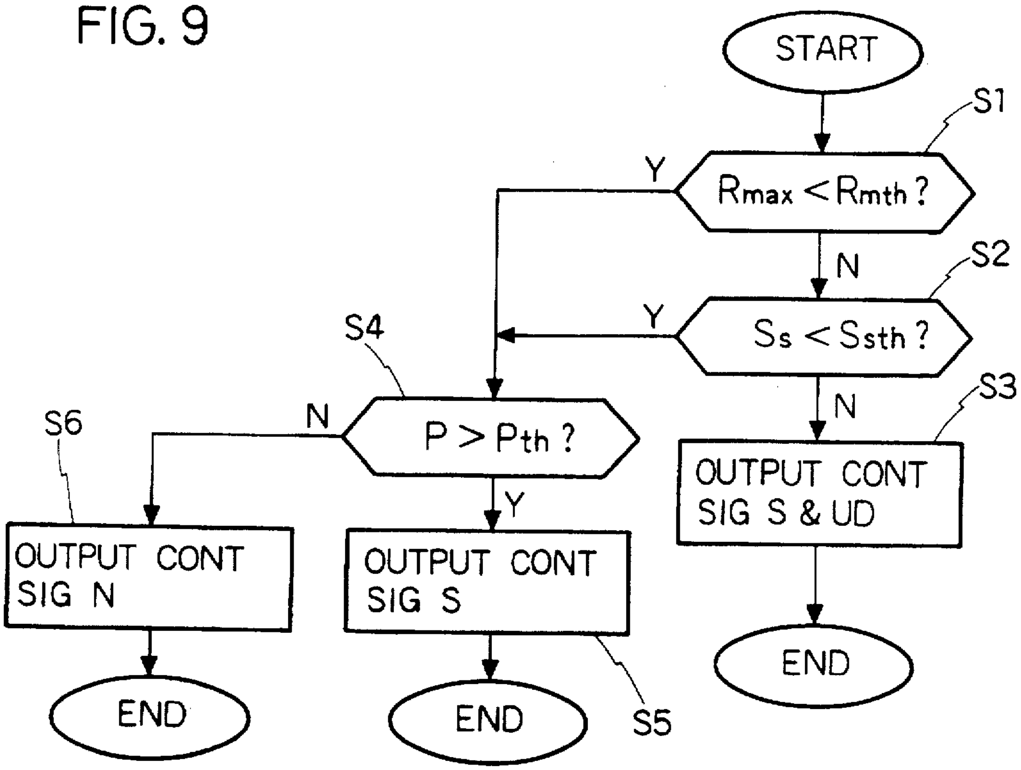
FIG. 9 is a flowchart showing a speech/non-speech identification algorithm which is performed by an identification part 25A in the FIG. 8 example.

The identification part 25A uses the identification algorithm of FIG. 9 to determine if the analysis period of the input signal is a speech signal or noise period as described below.

In step S1 the maximum autocorrelation coefficient Rmax from the maximum autocorrelation coefficient detecting part 24 is compared with the autocorrelation threshold value Rmth, and if the former is equal to or larger than the latter, the input signal of the analysis period is decided to be speech or noise containing a pitch period component. In this instance, in step S2, the slope $S_s$ of the power spectrum S(f) of that analysis period is compared with the slope threshold value $S_s$th; if they are equal to each other, or if the former is larger than the latter, the current analysis period is a speech period and, in step S3, a signal indicating the speech period is output as a switch control signal S, which is applied to the switches 32 and 41 in FIG. 2 to connecting them to the S-side. At the same time, an update control signal UD is fed to the power threshold value updating part 25B to cause it to update the power threshold value Pth by Eq. (8). Hence, in this case, the spectrum S(f) is not provided to the noise spectrum updating part 33 in FIG. 2, and consequently, the noise spectrum updating does not take place. The updating in the average noise level storage part 42 is not performed either. When it is found in step S2 that the slope $S_s$ is smaller than the threshold value $S_s$th, it is decided that the current analysis period is a noise period containing a pitch period component, in which case the detected power P from the power detecting part 26 is compared with the power threshold value Pth in step S4. If the former is larger than the latter, the input signal is decided to be nonstationary noise, and in this instance the switch control signal S is output in step S5 as in the case of the speech period but the update control signal UD is not provided.

When it is decided in step S1 that the maximum autocorrelation coefficient Rmax is smaller than the threshold value Rmth, the current signal period is a non-speech period and the algorithm proceeds to step S4. In step S4, as is the case with the above, a check is made to see if power of the analysis period is larger than the threshold value Pth; if so, it is decided that the signal of the current analysis period is nonstationary noise of large power, and as in the case of the speech period, the switch control signal S is provided in step S5, connecting the switches 32 and 41 to the S-side. Hence, the noise spectrum is not updated and the loss L is not updated either. When it is found in step S4 that the power P is not larger than the threshold value Pth, the current analysis period is decided to be a stationary noise period and in step S6 a signal indicating that the input signal of that period is noise is applied as a switch control signal N to the switches 32 and 41 to connect them to the N-side. According to the control algorithm shown in FIG. 9, the power threshold value Pth in the speech/non-speech identification part 25 is updated only when the input signal is a speech signal and this updating is not executed when the input signal period is a noise period containing the pitch period component—this permits reduction of errors in the identification of the speech period.

Figure 10:
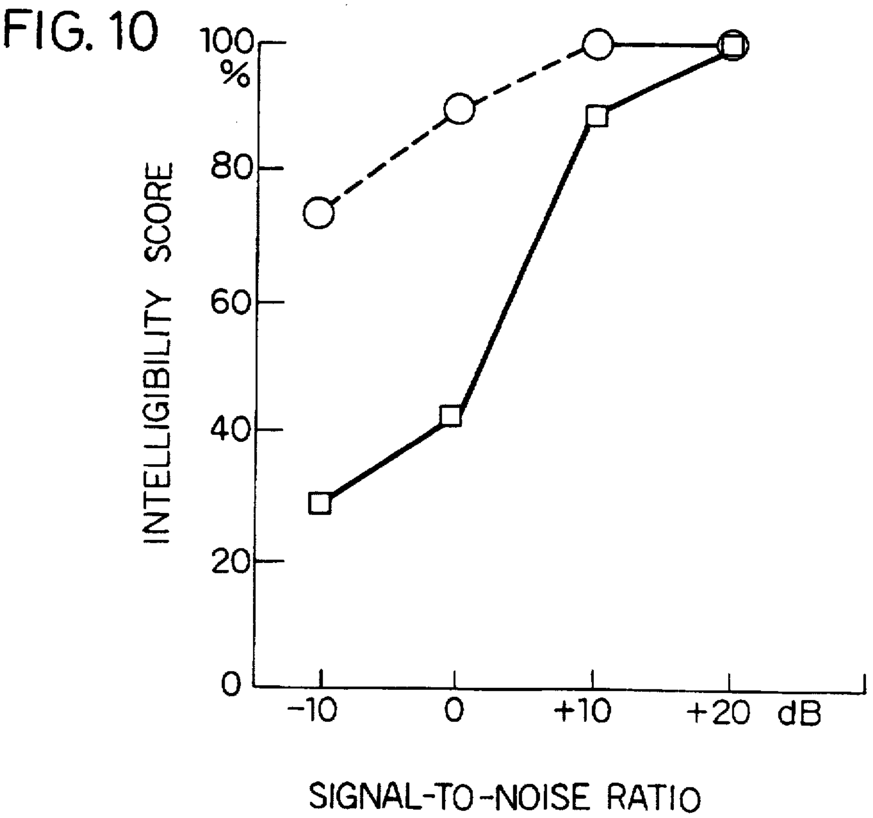
FIG. 10 is a graph showing measured results of a speech identification success rate by a hearing-impaired person who used the noise suppressor of the present invention.

FIG. 10 shows experimental results on the effect of the acoustic noise suppressor according to the FIG. 2 embodiment. In the experiments, a signal produced by superimposing magnetic jitter noise and a speech signal on each other was supplied to headphones worn by a hearing-impaired male directly and through the acoustic noise suppressor of the present invention, and the intelligibility scores or speech identification rates in the both cases were measured for different values of the SN (speech signal to jitter noise) ratio. The curve joining squares indicates the case where the acoustic noise suppressor was not used, and the curve joining circles the case where the acoustic noise suppressor was used. As is evident from FIG. 10, the intelligibility score without the acoustic noise suppressor sharply drops when the SN ratio becomes lower than 10 dB, whereas when the acoustic noise suppressor is used, the intelligibility score remains above 70% even if the SN ratio drops to −10 dB, indicating an excellent noise suppressing effect of the present invention.

Conventionally, hearing aids for hearing-impaired persons are designed so that the input signal is amplified by merely amplifying the input signal level, or by using an amplifier of a frequency characteristic corresponding to the hearing characteristic of each user, so that an increase in the amplifier gain causes an increase in the background noise level, too, and hence it gives a feeling of discomfort to the hearing aid user or does not serve to increase the intelligibility score. From FIG. 10 it will be appreciated that the acoustic noise suppressor of the present invention, if incorporated as an IC in a hearing aid, will greatly help enhance its performance since the noise suppressor ensures suppression of stationary background noise.

Figure 11:
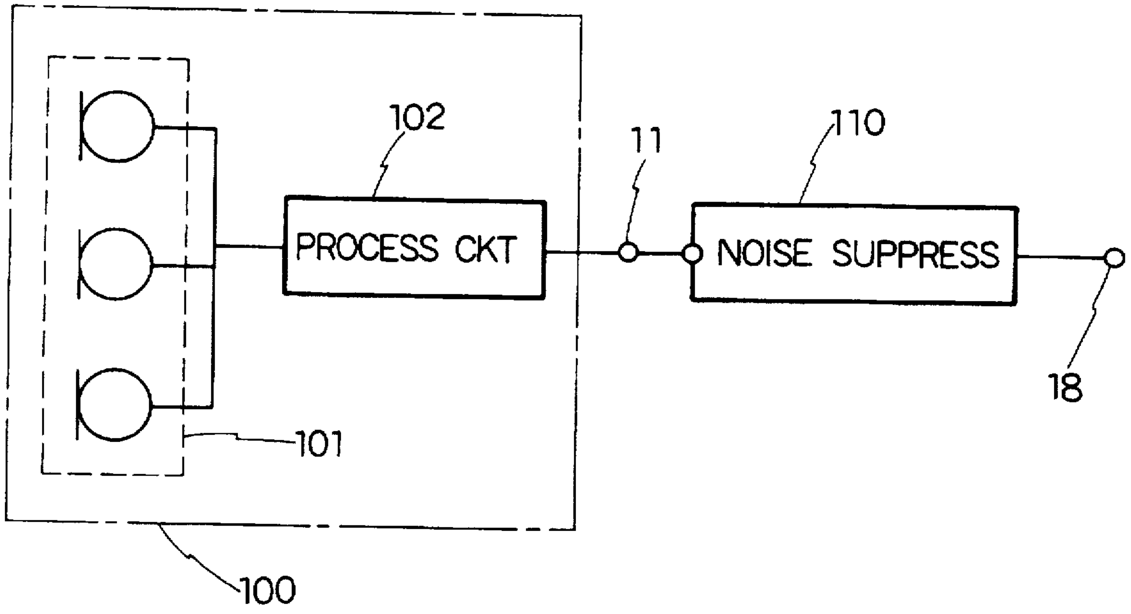
FIG. 11 is a block diagram illustrating the noise suppressor of the present invention applied to a multi-microphone system.

FIG. 11 illustrates in block form an example of the acoustic noise suppressor of the present invention applied to a multi-microphone system. Reference numeral 100 denotes generally a multi-microphone system, which is composed of, for example, 10 microphones 101 and a processing circuit 102, and reference numeral 11 denotes an input terminal 11 of the acoustic noise suppressor of the present invention which is connected to the output of the multi-microphone system 100. Even with the acoustic noise suppressor of the FIG. 2 embodiment, no noise suppression effect is obtained when the speech signal level becomes nearly equal to the noise level (that is, when the SN ratio is approximately 0 dB) as will be inferred from Eq. (3). In FIG. 11, the amounts of delay for output signals from respective microphones with respect to a particular sound source are adjusted by the processing circuit 102 so that they become in phase with one another. By this, signal components from sound sources other than the particular one are cancelled and become low-level, whereas the signal levels from the specified sound source are added to obtain a high-level signal. As a result, the SN ratio of the target speech signal to be input into the acoustic noise suppressor 110 can be enhanced; hence, the acoustic noise suppressor 110 can be driven effectively.

EFFECT OF THE INVENTION

As described above, according to the present invention, since mean noise power spectrum, which is psychoacoustically weighted large in the low-frequency region and small in the high-frequency region, is subtracted from the input signal power spectrum, stationary noise can be effectively minimized. This minimizes distortion of the target signal and significantly removes residual noise which is harsh to the ear.

By further loss control for the residual noise after noise suppression, the residual noise left unsuppressed only with the weighting function can be suppressed almost completely.

Thus, according to the present invention, residual noise which could not be completely removed in the past is processed to make it hard to hear, by which noise can be suppressed efficiently. Hence, the acoustic noise suppressor of the present invention is very easy on the ears and can be used comfortably.

It will be apparent that many modifications and variations may be effected without departing from the scope of the novel concepts of the present invention.

What is claimed is:

1. An acoustic noise suppressor which is supplied, as an input signal, with an acoustic signal in which noise and a target signal are mixed, for suppressing said noise in said input signal, comprising:

frequency analysis means for making a frequency analysis of said input signal for each fixed period to extract its power spectral component and phase component;

analysis/discrimination means for analyzing said input signal for said each fixed period to see if it is said target signal or noise and for outputting the determination result;

noise spectrum update/storage means for calculating an average noise power spectrum from the power spectrum of said input signal of the period during which said determination result is indicative of noise and storing said average noise power spectrum;

psychoacoustically weighted subtraction means for weighing said average noise power spectrum by a psychoacoustic weighing coefficient and for subtracting said weighted average noise power spectrum from said input signal power spectrum to obtain the difference power spectrum; and inverse frequency analysis means for converting said difference power spectrum into a time-domain signal;

said psychoacoustic weighing coefficient being set so that, letting the frequency band of said input signal be split into regions lower and higher than a desired frequency, the average function in said lower frequency region is larger than in said higher frequency region.

2. The acoustic noise suppressor of claim 1, further comprising: average noise level storage means supplied, as residual noise, with the output from said inverse frequency analysis means of said period decided to be a noise period, for calculating and storing the average level of said residual noise; loss control coefficient calculating means for calculating a loss control coefficient on the basis of said residual noise; and calculating means for controlling the loss of the output signal from said inverse frequency analysis means on the basis of said loss control coefficient.

3. The acoustic noise suppressor of claim 1, wherein, letting the band of said input signal and the frequency number be represented by fc and i, respectively, said psychoacoustic weighting function is given by the following equation $$W(i)=\{B-(B/fc)i\}+K,\ i=0,1,\ldots,fc$$

where K and B are predetermined values.

4. The acoustic noise suppressor of claim 1, wherein said analysis/discrimination means comprises: LPC analysis means for making an LPC analysis of said input signal for said each fixed period and for outputting an LPC residual signal; autocorrelation analysis means for making an autocorrelation analysis of said LPC residual signal to detect the maximum autocorrelation coefficient; average power calculation means for calculating the average power of said input signal for said each fixed period; spectral slope detecting means for detecting the slope of said power spectrum from said frequency analysis means; and identification means which, when said maximum autocorrelation coefficient is smaller than a correlation threshold value and said average power is smaller than a power threshold value, decides that said input signal of said period is stationary noise and, when said maximum autocorrelation coefficient is not smaller than said correlation threshold value and said spectral slope is not smaller than a slope threshold value, decides that said input signal of said period is a signal of a speech period.

5. The acoustic noise suppressor of claim 4, wherein said identification means includes power threshold value update means which, when it decides that said input signal is a speech signal, averages the averages power of that period and the power threshold values in the past to obtain said power threshold value.

6. The acoustic noise suppressor of claim 1 or 5, wherein said noise spectrum update/storage means includes means for calculating and storing an average noise spectrum updated using the power spectrum of said period decided to be noise and an average noise power spectrum in the past.

7. The acoustic noise suppressor of claim 1, wherein said psychoacoustically weighted subtraction means includes means for comparing, for each frequency, said average noise power spectrum from said noise spectrum update/storage means and said power spectrum level from said frequency analysis means and for selectively outputting said difference power spectrum or a predetermined level on the basis of the result of said comparison.

8. An acoustic noise suppressor of claim 1 or 5, wherein said psychoacoustically weighted subtraction means includes means for comparing, for each frequency, said average noise power spectrum from said noise spectrum update/storage means and said power spectrum level from said frequency analysis means and for selectively outputting said difference power spectrum or predetermined low-level noise on the basis of the result of said comparison.

9. The acoustic noise suppressor of claim 1 or 5, wherein said psychoacoustically weighted subtraction means includes means for comparing, for each frequency, said average noise power spectrum from said noise spectrum update/storage means and said power spectrum level from said frequency analysis means and for selectively outputting said difference power spectrum or a spectrum obtained by attenuating said average noise power spectrum on the basis of the result of said comparison.

10. The acoustic noise suppressor of claim 6, wherein said means for calculating and storing includes means for calculating said updated average noise power spectrum from a weighted average of said power spectrum of said period decided to be noise and said average noise power spectrum in the past.

11. An acoustic noise suppressor which is supplied, as an input signal, with an acoustic signal in which noise and a target signal are mixed, for suppressing said noise in said input signal, comprising:

frequency analysis means for making a frequency analysis of said input signal for each fixed period to extract its power spectral component and phase component;

analysis/discrimination means for analyzing said input signal for said each fixed period to see if it is said target signal or noise and for outputting the determination result;

noise spectrum update/storage means for calculating an average noise power spectrum from the power spectrum of said input signal of the period during which said determination result is indicative of noise and storing said average noise power spectrum;

psychoacoustically weighted subtraction means for weighing said average noise power spectrum by a psychoacoustic weighing coefficient and for subtracting said weighted average noise power spectrum from said input signal power spectrum to obtain the difference power spectrum; and inverse frequency analysis means for converting said difference power spectrum into a time-domain signal;

said analysis/discrimination means comprising LPC analysis means for making an LPC analysis of said input signal for said each fixed period and for outputting an LPC residual signal; autocorrelation analysis means for making an autocorrelation analysis of said LPC residual signal to detect the maximum autocorrelation coefficient; and identification means for checking whether said signal of said period is said target signal or noise, using said maximum autocorrelation coefficient.

* * * * *